(12) United States Patent
Nealis et al.

(10) Patent No.: US 10,785,311 B2
(45) Date of Patent: *Sep. 22, 2020

(54) SECURE CLOUD-MANAGED CONTENT DELIVERY COMPUTER ECOSYSTEM

(71) Applicant: Pearson Education, Inc., New York, NY (US)

(72) Inventors: Michael Nealis, New York, NY (US); Corey Hoesley, New York, NY (US); Nick Wilson, New York, NY (US)

(73) Assignee: PEARSON EDUCATION, INC., New York, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/593,159

(22) Filed: May 11, 2017

(65) Prior Publication Data

US 2018/0131772 A1 May 10, 2018

Related U.S. Application Data

(60) Provisional application No. 62/419,307, filed on Nov. 8, 2016.

(51) Int. Cl.
*H04L 29/08* (2006.01)
*H04L 12/46* (2006.01)
(Continued)

(52) U.S. Cl.
CPC .......... *H04L 67/141* (2013.01); *G06F 21/10* (2013.01); *G06F 21/53* (2013.01); *H04L 12/4641* (2013.01); *H04L 63/0428* (2013.01); *H04L 63/10* (2013.01); *H04L 67/143* (2013.01); *H04L 69/16* (2013.01); *H04W 12/08* (2013.01);
(Continued)

(58) Field of Classification Search
None
See application file for complete search history.

(56) References Cited

U.S. PATENT DOCUMENTS

| | | | |
|---|---|---|---|
| 8,732,607 B1 * | 5/2014 | Grechishkin | G06F 9/45558 715/781 |
| 2007/0117083 A1 * | 5/2007 | Winneg | G09B 7/00 434/350 |

(Continued)

FOREIGN PATENT DOCUMENTS

WO     2013048425 A1     4/2012

OTHER PUBLICATIONS

"Why not use what you already own to lower the TCO of your desktop or application virtualization project?", ThinLaunch Software, LLC Nov. 2013, 6 pages.

(Continued)

*Primary Examiner* — Philip J Chea
*Assistant Examiner* — Hassan A Khan
(74) *Attorney, Agent, or Firm* — Quarles and Brady LLP

(57) ABSTRACT

Systems and methods for secure content delivery are disclosed herein. The system can include a content driver communicatingly connected with a user device via a layered protocol model or via a User Datagram Protocol (UDP). The content driver can direct the launch of first and second virtual machines on the user device and can provide encrypted pixel data to the second virtual machine. The second virtual machine can generate and display an image based on the received encrypted pixel data.

18 Claims, 14 Drawing Sheets

(51) Int. Cl.
*H04L 29/06* (2006.01)
*H04W 12/08* (2009.01)
*G06F 9/455* (2018.01)
*G06F 21/53* (2013.01)
*G06F 21/10* (2013.01)

(52) U.S. Cl.
CPC ............ *G06F 9/45558* (2013.01); *G06F 2009/45587* (2013.01); *G06F 2221/2107* (2013.01); *G06F 2221/2149* (2013.01)

(56) References Cited

U.S. PATENT DOCUMENTS

| | | | |
|---|---|---|---|
| 2007/0122790 A1* | 5/2007 | Sperle | G09B 5/00 |
| | | | 434/350 |
| 2009/0017432 A1 | 1/2009 | Hoffmann et al. | |
| 2009/0193173 A1 | 7/2009 | Joshi et al. | |
| 2010/0125675 A1* | 5/2010 | Richardson | H04L 61/15 |
| | | | 709/242 |
| 2011/0113467 A1 | 5/2011 | Agarwal et al. | |
| 2011/0126110 A1 | 5/2011 | Vilke et al. | |
| 2011/0224811 A1 | 9/2011 | Lauwers et al. | |
| 2012/0131574 A1 | 5/2012 | Day, II et al. | |
| 2014/0272911 A1* | 9/2014 | York | G09B 7/07 |
| | | | 434/362 |
| 2014/0337223 A1 | 11/2014 | Kapoor | |
| 2015/0067097 A1* | 3/2015 | Hsia | G06Q 10/06311 |
| | | | 709/217 |
| 2015/0147741 A1* | 5/2015 | Spagnola | G09B 7/04 |
| | | | 434/362 |
| 2015/0221056 A1* | 8/2015 | Jones | G06O 10/109 |
| | | | 705/326 |
| 2016/0035233 A1* | 2/2016 | Breed | G09B 7/00 |
| | | | 345/8 |
| 2016/0044088 A1* | 2/2016 | Momchilov | G06F 3/1454 |
| | | | 715/740 |
| 2016/0087933 A1* | 3/2016 | Johnson | H04W 4/70 |
| | | | 709/245 |
| 2016/0226955 A1* | 8/2016 | Moorthi | G06Q 10/06 |
| 2017/0034050 A1 | 2/2017 | Sunavala et al. | |
| 2017/0371519 A1 | 12/2017 | Beveridge et al. | |

OTHER PUBLICATIONS

"Thin Desktop has but one requirement", ThinLaunch Software, LLC [retrieved Apr. 21, 2017] accessed from http://thinlaunch.com/wp-content/uploads/ThinDesktopWindowsVersusLinux-website.docx2013PDF.pdf, 2 pages.

Jack, IEEE Conferences I Oct. 1, 2007 12007 37th Annual Frontiers in Education Conference—Global Engineering: Knowledge Without Borders, Opportunities Without Passports (pp. S3G-23-S3G-25) (Year: 2007).

Yile, Utilizing the Virtualization Technology in Computer Operating System Teaching, 2016 Eighth International Conference on Measuring Technology and Mechatronics Automation (ICMTMA) (Year: 2016).

* cited by examiner

SECURE CLOUD-MANAGED CONTENT DELIVERY COMPUTER ECOSYSTEM

CROSS-REFERENCES TO RELATED APPLICATIONS

This application claims the benefit of U.S. Provisional Application No. 62/419,307, filed on Nov. 8, 2016, and entitled "SECURE CLOUD-MANAGED ASSESSMENTS DELIVERY ECOSYSTEM", the entirety of which is hereby incorporated by reference herein.

BACKGROUND

Cloud computing is a type of Internet-based computing that can provide shared computer processing resources and data to computers and other devices on demand. It is a model for enabling ubiquitous, on-demand access to a shared pool of configurable computing resources (e.g., computer networks, servers, storage, applications and services), which can be rapidly provisioned and released with minimal management effort. Cloud computing and storage solutions provide users and enterprises with various capabilities to store and process their data in third-party data centers that may be located far from the user; ranging in distance from across a city to across the world. Cloud computing relies on sharing of resources to achieve coherence and economy of scale, similar to a utility (like the electricity grid) over an electricity network.

While cloud computing has many advantages, it also has drawbacks that have yet to be addressed. Accordingly, new systems and method for using cloud computing are desired.

BRIEF SUMMARY

One aspect of the present disclosure relates to a system for securely providing content and/or for securely authoring or editing content. The system includes: a database; and a server communicatingly connected to the database. The server includes: an evaluation module that can receive response information and evaluate the received response information; and a content driver communicatingly connected to the evaluation module and the database. The content driver can: launch in response to receipt of a launch signal; generate a signal directing the launch of a first virtual machine on a user device; generate a signal directing the launch of a second virtual machine within the first virtual machine; identify content for delivery to the second virtual machine; generate pixel data for the content for delivery to the second virtual machine; sending the pixel data to the second virtual machine; receive a plurality of response inputs from the second virtual machine; generate a response based on the received response inputs; and provide the generated response to the evaluation module.

In some embodiments, the database includes content for delivery to a user device and evaluation content associated with the content for delivery to the user device. In some embodiments, the generated pixel data is encrypted. In some embodiments, the content driver includes a codec that can encrypt the pixel data. In some embodiments, the server can communicate with the user device via a User Datagram Protocol. In some embodiments, the User Datagram Protocol is a remote display protocol.

In some embodiments, generating a response includes aggregating at least one response input. In some embodiments, the evaluation module can retrieve evaluation data from the database and evaluate the generated response according to the retrieved evaluation data. In some embodiments, the content driver can generate a communicating connection to the user device. In some embodiments, the content driver can: determine completion of content delivery to the user device; and terminate the communicating connection with the user device. In some embodiments, the server and the database can be communicatingly connected with a backend server and a backend database via a communication network. In some embodiments, the content for delivery to the user device comprises a test.

One aspect of the present disclosure relates to a method of securely providing content. The method includes: launching a content driver in response to receipt of a launch signal; generating a signal with the content driver directing the launch of a first virtual machine on a user device; generating a signal with the content driver directing the launch of a second virtual machine within the first virtual machine; identifying with the content driver content for delivery to the second virtual machine; generating pixel data with the content driver for the content for delivery to the second virtual machine; sending the pixel data from the content driver to the second virtual machine; receiving a plurality of response inputs at the content driver from the second virtual machine; generating with the content driver a response based on the received response inputs; and evaluating the response.

In some embodiments, the generated pixel data is encrypted. In some embodiments, the generated pixel data is encrypted with a codec. In some embodiments, the pixel data is sent to the second virtual machine via a User Datagram Protocol. In some embodiments, the User Datagram Protocol includes a remote display protocol. In some embodiments, generating a response increases aggregating at least one response input.

In some embodiments, the method further includes retrieving evaluation data and evaluating the generated response according to the retrieved evaluation data. In some embodiments, the method includes generating a communicating connection to the user device. In some embodiments, the method further includes: determining completion of content delivery to the user device; and terminating the communicating connection with the user device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
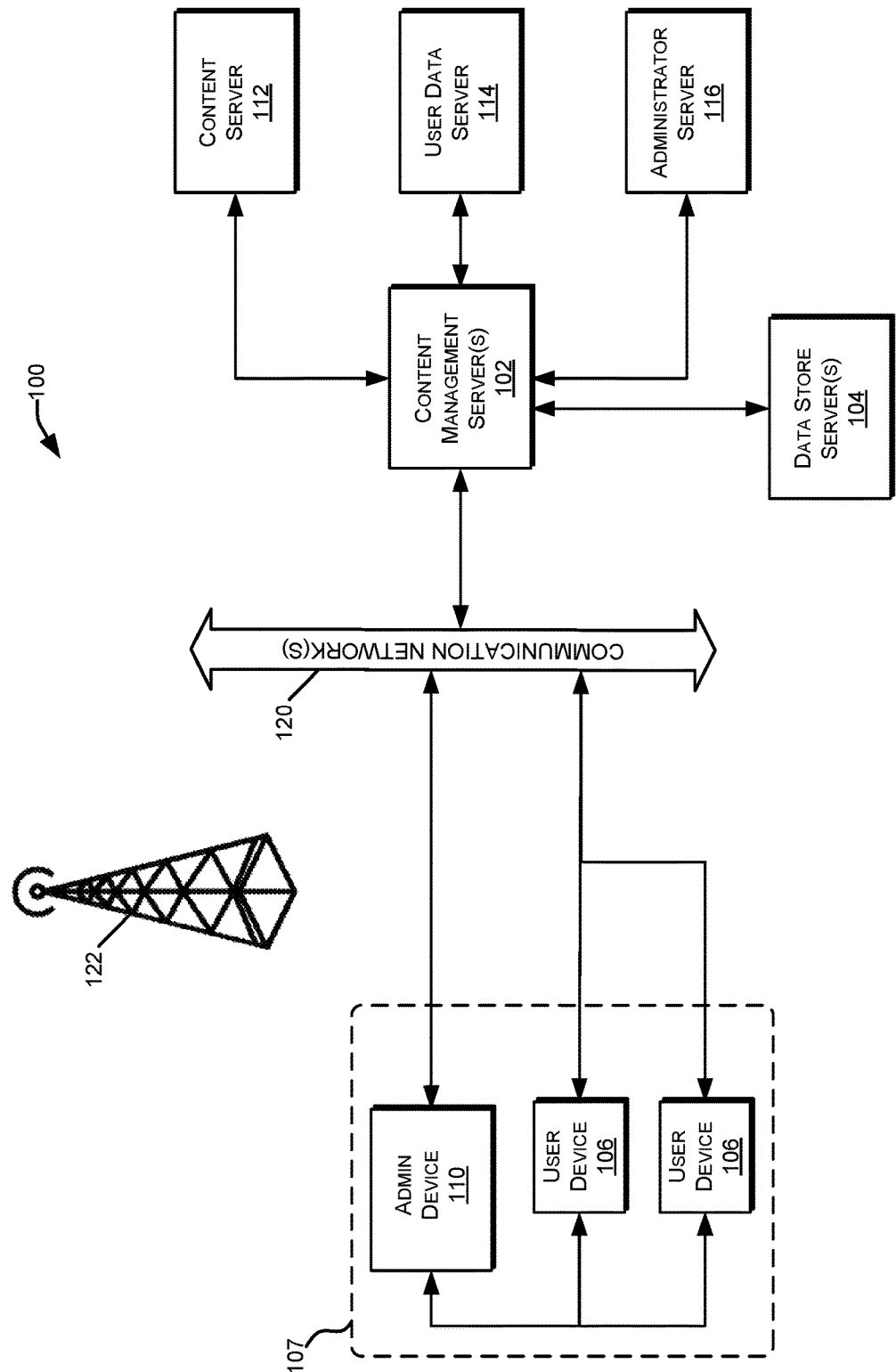
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or administrator devices 110, also referred to herein as supervisor devices 110. User devices 106 and administrator devices 110 may display content received via the content distribution network 100, and may support various types of user interactions with the content. User devices 106 and administrator devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and administrator devices 110 may be general purpose personal computers or special-purpose computing devices including, by way of example, personal computers, laptop computers, workstation computers, projection devices, and interactive room display systems. Additionally, user devices 106 and administrator devices 110 may be any other electronic devices, such as a thin-client computers, an Internet-enabled gaming systems, business or home appliances, and/or a personal not available to the other devices.

The user devices 106 and/or the administrator device(s) 110 can be co-located within, for example, a testing center 107, a location, a network such as a Local Area Network (LAN), or the like. In some embodiments, the testing center 107, including the user devices 106 and/or the administrator device(s) 110, can be remote from other components of the CDN 100, and can be in communicating connection with one or several other component of the CDN 100 via the communication network 120.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the administrator devices 110. In some embodiments, this communication can include the transmission of a signal from the navigation system 122 which signal is received by one or several components of the content distribution network 100 and can be used to determine the location of the one or several components of the content distribution network 100.

Figure 2:
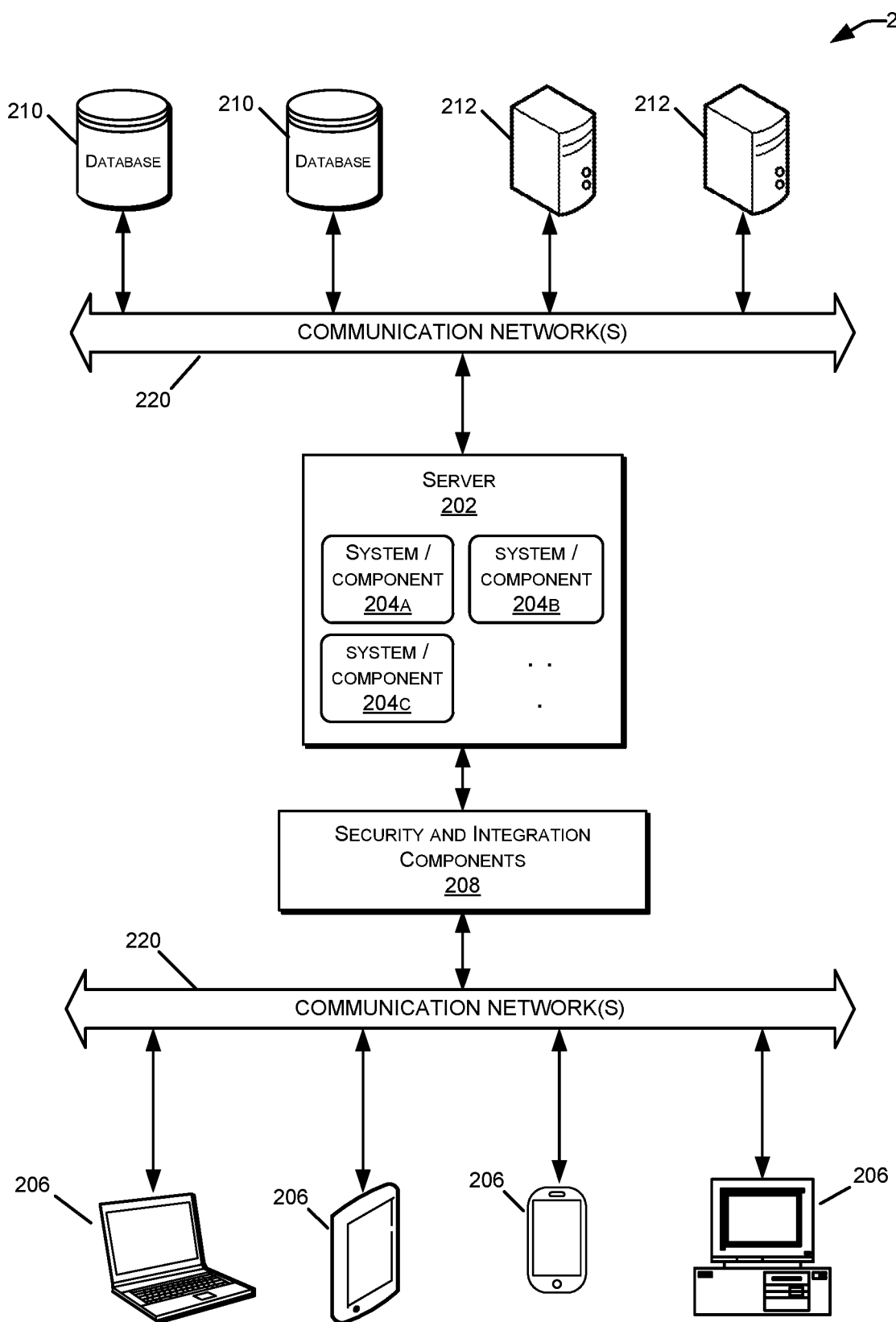
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
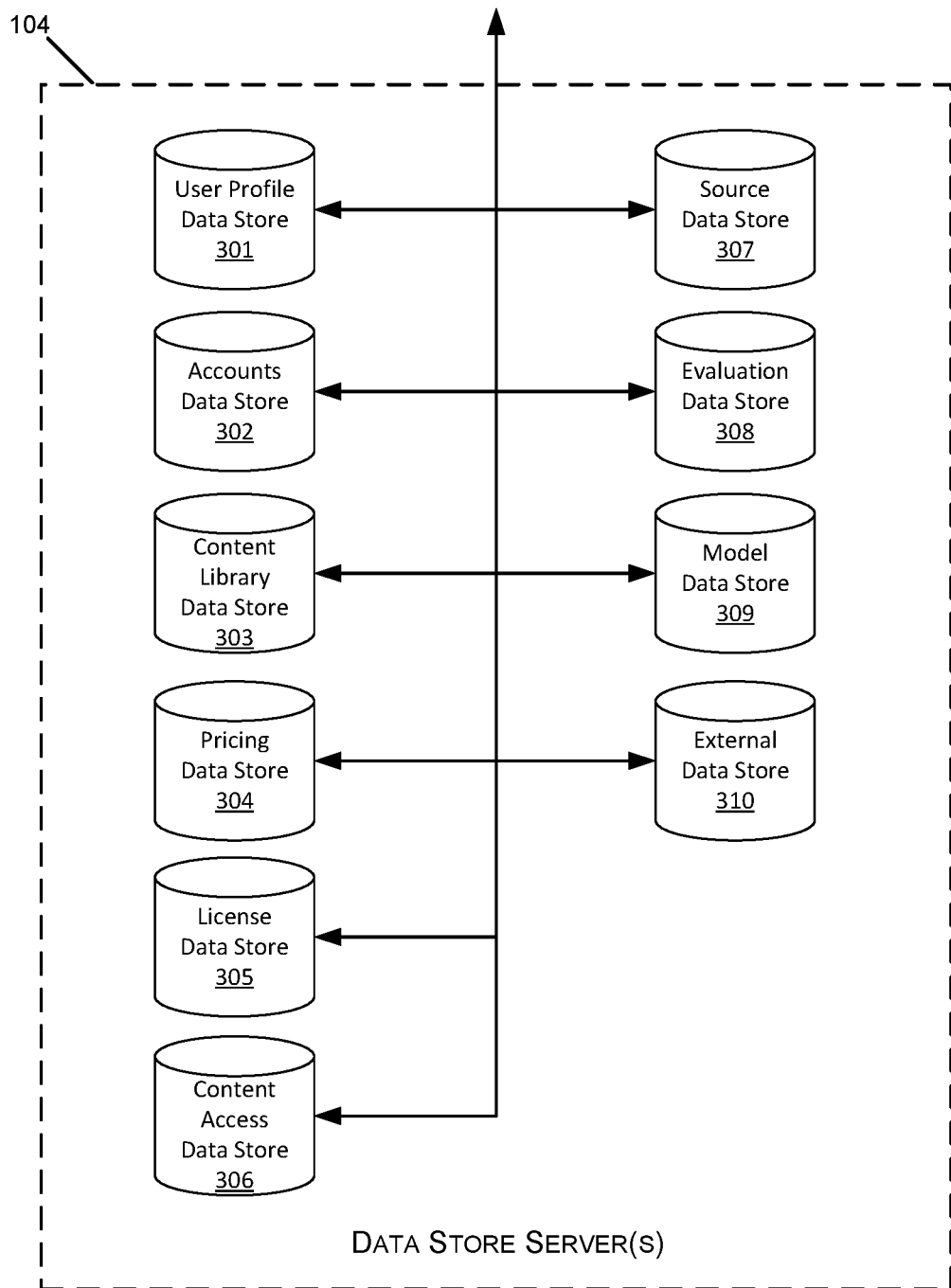
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-310 may reside in storage on a single computer server 104 (or a single server farm or cluster) under the control of a single entity, or may reside on separate servers operated by different entities and/or at remote locations. In some embodiments, data stores 301-310 may be accessed by the content management server 102 and/or other devices and servers within the network 100 (e.g., user devices 106, administrator devices 110, administrator servers 116, etc.). Access to one or more of the data stores 301-310 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-310, including their functionality and types of data stored therein, are illustrative and non-limiting. Data stores server architecture, design, and the execution of specific data stores 301-310 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, content authors, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or administrator devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile database 301 can include information relating to one or several student-user behaviours including, for example: attendance in one or several courses; attendance and/or participation in one or several study groups; extramural, student group, and/or club involve and/or participation, or the like. In some embodiments, this information relating to one or several student-user behaviours can include information relating to the student-users schedule.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library database 303 can comprise information to facilitate in authoring new content. This information can comprise, for example, one or several specifications identifying attributes and/or requirements of desired newly authored content. In some embodiments, for example, a content specification can identify one or several of a subject matter; length, difficulty level, or the like for desired newly authored content.

In some embodiments, the content library database 303 can further include information for use in evaluating newly authored content. In some embodiments, this evaluation can comprise a determination of whether and/or the degree to which the newly authored content corresponds to the content specification, or some or all of the requirements of the content specification. In some embodiments, this information for use in evaluation newly authored content can identify or define one or several difficulty levels and/or can identify or define one or several acceptable difficulty levels. In some embodiments, for example, this information for use in evaluation newly authored content can define a plurality of difficulty levels and can delineate between these difficulty levels, and in some embodiments, this information for use in evaluation newly authored content can identify which of the defined difficulty levels are acceptable. In other embodiments, this information for use in evaluation newly authored content can merely include one or several definitions of acceptable difficulty levels, which acceptable difficulty level can be based on one or several pre-existing difficult measures such as, for example, an Item Response Theory (IRT) value such as, for example, an IRT b value, ap value indicative of the proportion of correct responses in a set of responses, a grade level, or the like.

In some embodiments, this information for use in evaluation newly authored content can further define one or several differentiation and/or discrimination levels and/or define one or several acceptable differentiation and/or discrimination levels or ranges. As used herein, "differentiation" and "discrimination" refer to the degree to which an item such as a question identifies low ability versus high ability users. In some embodiments, this information for use in evaluation newly authored content can identify one or several acceptable levels and/or ranges of discrimination which levels and/or ranges can be based on one or several currently existing discrimination measures such as, for example, a Point-Biserial Correlation.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and/or transaction volume. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these one or several predictive models can be used to: generate a prediction of the risk of a student-user not achieving one or several predetermined outcomes; generate a prediction of a categorization of the student-user, which categorization can indicate an expected effect of one or several interventions on the student-user; and/or generate a prediction of a priority for any identified intervention.

In some embodiments, the risk model can comprise one or several predictive models based on, for example, one or several computer learning techniques. In some embodiments, the risk model can be used to generate a risk value for a student, which risk value characterizes the risk of the student-user not achieving the predetermined outcome such as, for example, failing to complete a course or course of study, failing to graduate, failing to achieve a desired score or grade, or the like. In some embodiments, the risk model can comprise, for example, a decision tree learning model. In some embodiments, the risk model can generate the risk value through the inputting of one or several parameters, which parameters can be one or several values, into the risk model. These parameters can be generated based on one or several features or attributes of the student-user. The risk model, having received the input parameters, can then generate the risk value.

In some embodiments, the categorization model can determine a category of the student-user. In some embodiments, the categorization model can be used to generate one or several categorization values or identifiers that identify a category of the student-user. In some embodiments, this category can correspond to a likelihood of an intervention increasing or decreasing the risk value. In some embodiments, the categories can comprise a first category in which an intervention decreases the risk value, a second category in which an intervention increases the risk value, and a third category in which an intervention will not affect the risk value. In some embodiments, this third category can be further divided into a first group in which the student-users will likely fail to achieve the desired outcome regardless of intervention, and a second group in which the student-users will likely achieve the desired outcome regardless of intervention. In some embodiments, the categorization model can determine the category of the student-user through the input of one or several parameters relevant to the student-user into the categorization model. In some embodiments, these parameters can be generated from one or several features or attributes of the student-user that can be, for example, extracted from data relating to the student-user.

In some embodiments, the priority model can determine a priority value, which can be a prediction of the importance of any determined intervention. In some embodiments, this priority model can be determined based on information relating to the student-user for which the priority value is determined. In some embodiments, this priority value can be impacted by, for example, the value of the course associated with the risk value. In some embodiments, for example, the priority value may indicate a lower priority for a risk in a non-essential course. In such an embodiment, priority can be determined based on the credits of a course, based on the relevance of a course to, for example, a degree or major, based on the role of the course as a pre-requisite to subsequent courses, or the like.

In addition to the illustrative data stores described above, data store server(s) 104 (e.g., database servers, file-based storage servers, etc.) may include one or more external data aggregators 310. External data aggregators 310 may include third-party data sources accessible to the content management network 100, but not maintained by the content management network 100. External data aggregators 310 may include any electronic information source relating to the users, content resources, or applications of the content distribution network 100. For example, external data aggregators 310 may be third-party data stores containing demographic data, education related data, consumer sales data, health related data, and the like. Illustrative external data aggregators 310 may include, for example, social networking web servers, public records data stores, learning management systems, educational institution servers, business servers, consumer sales data stores, medical record data stores, etc. Data retrieved from various external data aggregators 310 may be used to verify and update user account information, suggest user content, and perform user and content evaluations.

Figure 4:
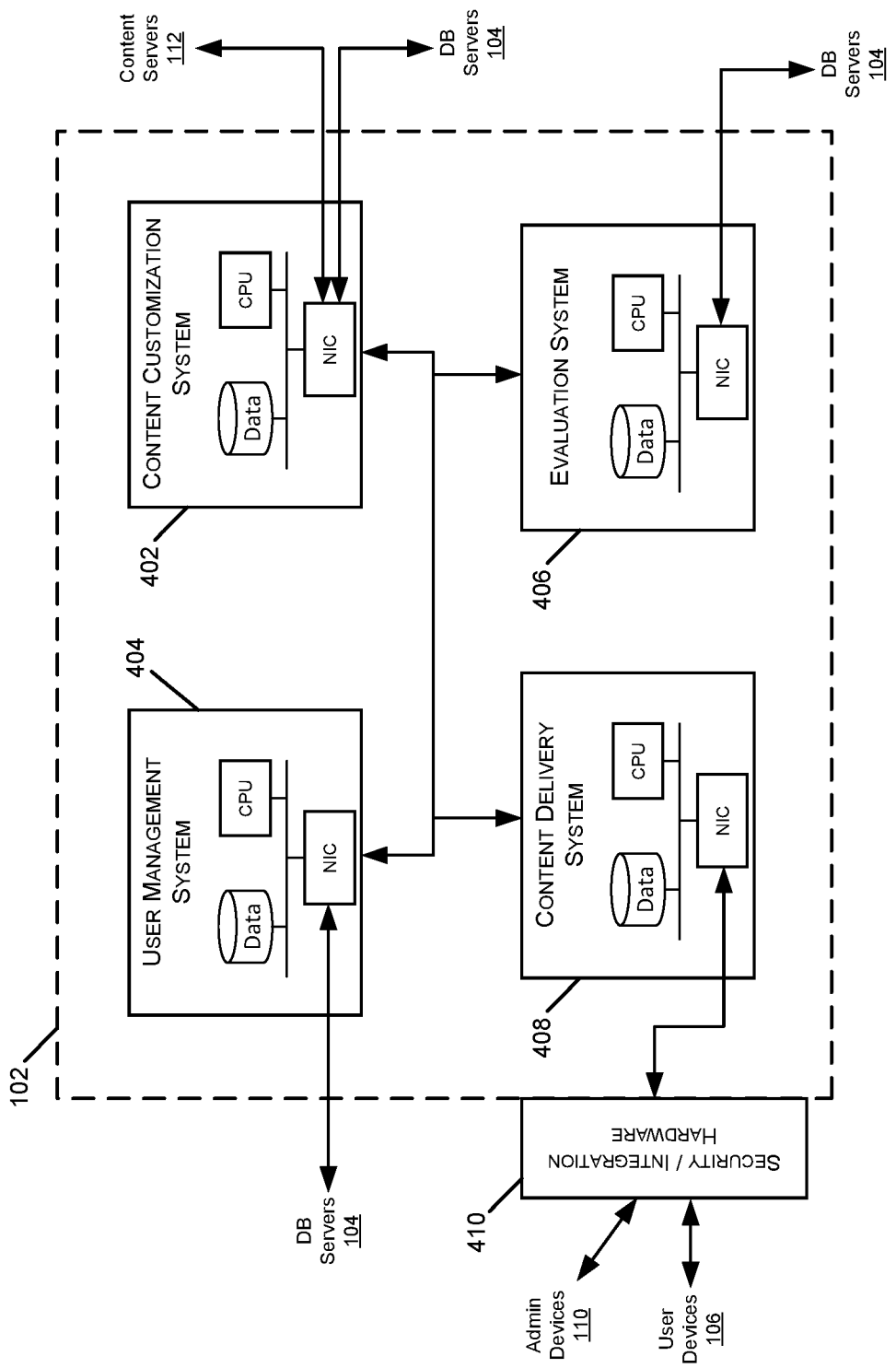
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user.

The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406, also referred to herein as a response processor. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, administrator devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, administrator devices 110, administrative servers 116, and other devices in the network 100.

Figure 5:
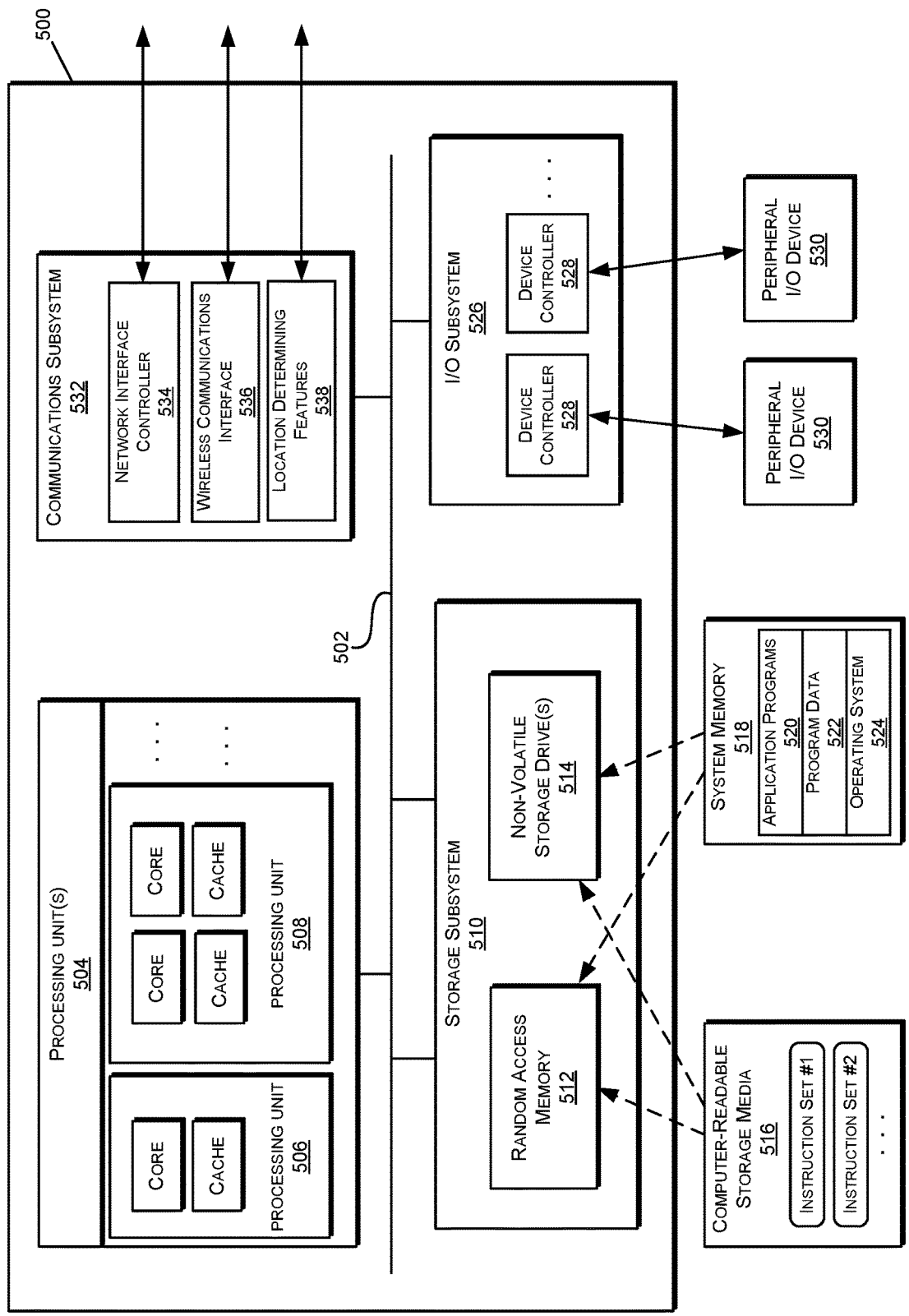
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the administrator device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
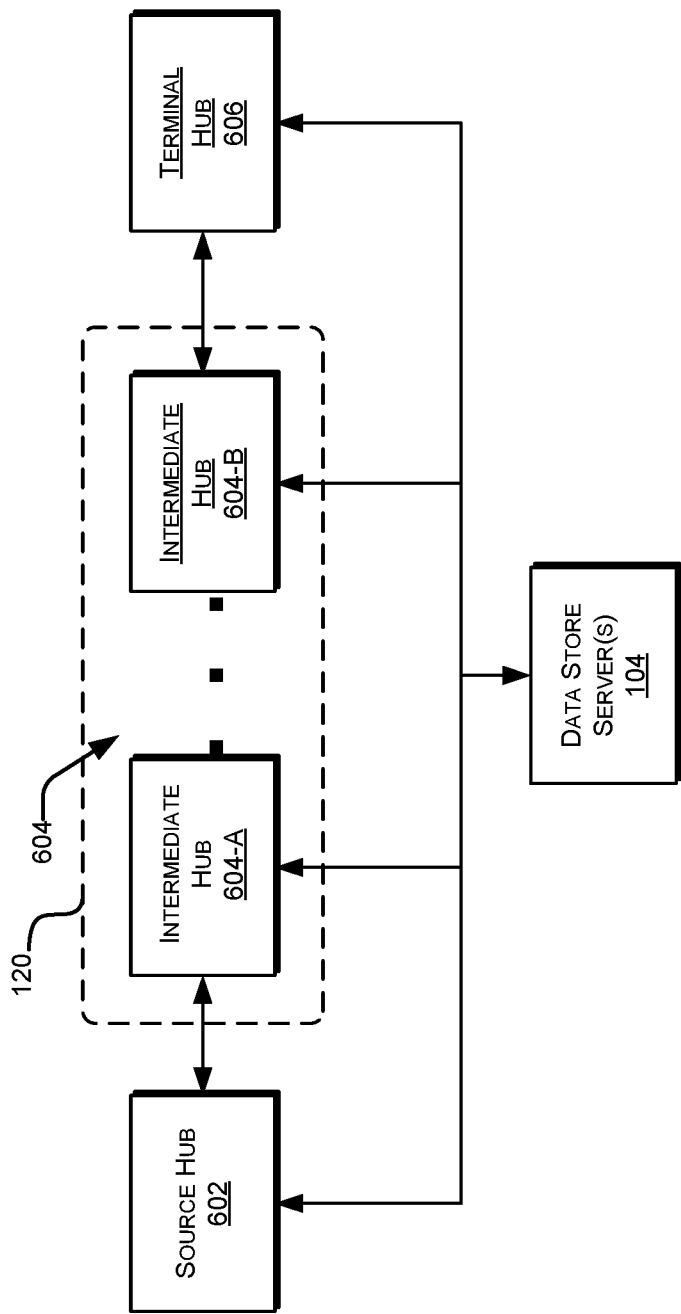
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 and a terminal hub 606 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the administrator device 110, and/or the server 102, and the terminal hub 606 can likewise be one or several of the user device 106, the administrator device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
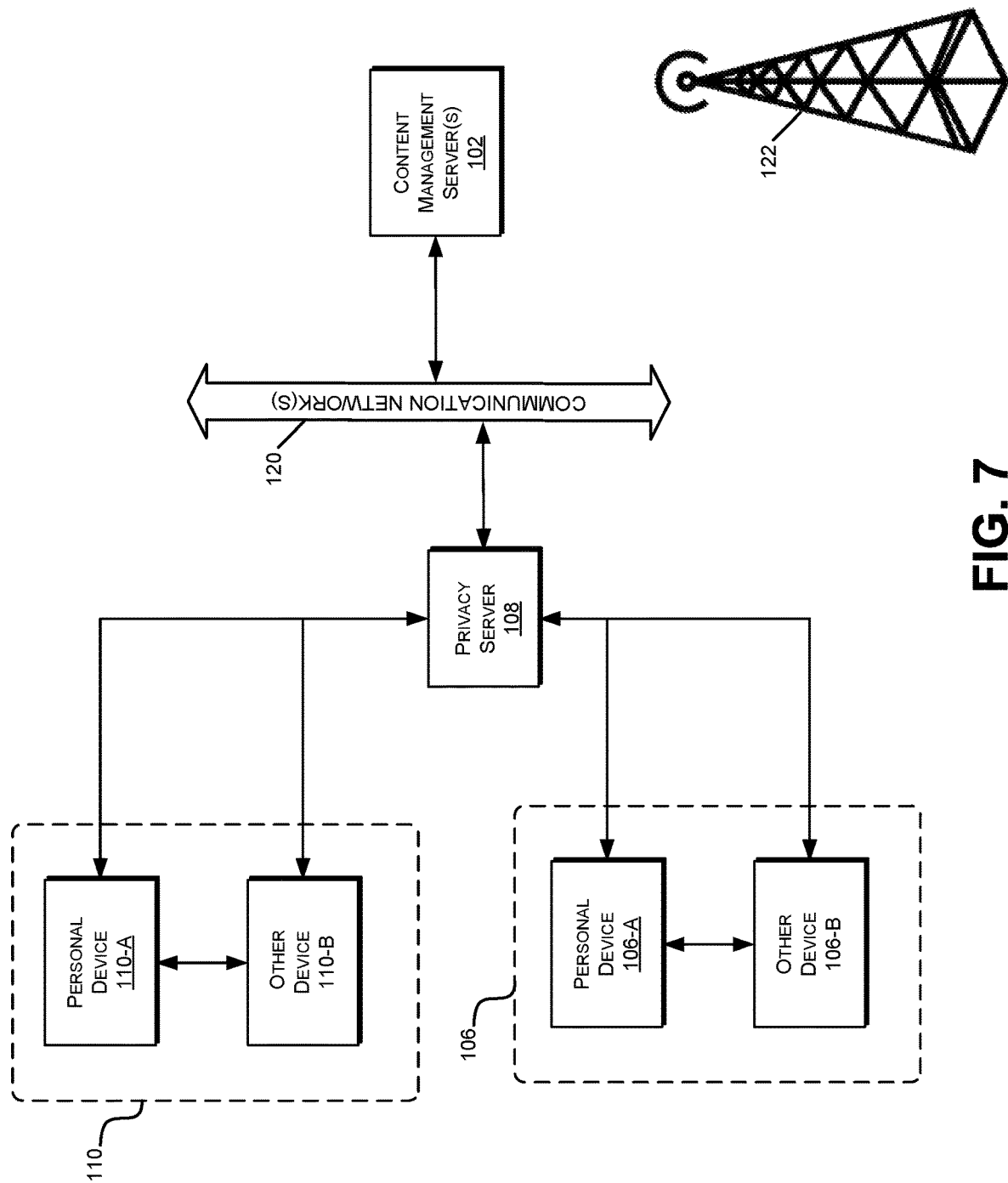
FIG. 7 is a block diagram illustrating one embodiment of user device and supervisor device communication.

With reference now to FIG. 7, a block diagram illustrating one embodiment of user device 106 and administrator device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the administrator device 110 can include a personal administrator device 110-A and one or several other administrator devices 110-B. In some embodiments, one or both of the personal administrator device 110-A and the one or several other administrator devices 110-B can be communicatingly connected to the content management server 102 and/or to the navigation system 122.

In some embodiments, the content distribution network can send one or more alerts to one or more user devices 106 and/or one or more administrator devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several administrator devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other administrator device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the administrator device 110 to display the alert, data contained in alert and/or an indicator of the alert.

Figure 8:
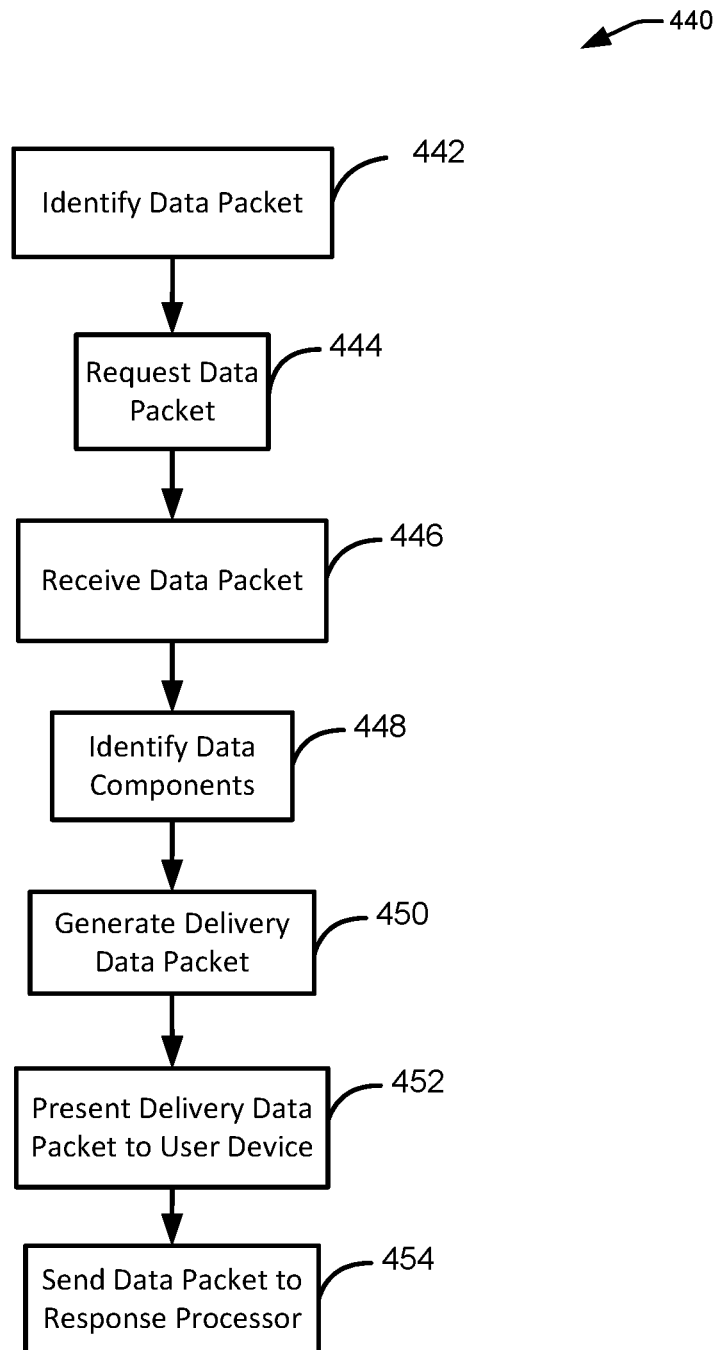
FIG. 8 is a flowchart illustrating one embodiment of a process for data management.

With reference now to FIG. 8, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization engine 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is provided to the user device 106 and more specifically to the view module 674. In some embodiments, this can include providing the delivery data packet to the user device 106 via, for example, the communication network 120.

After the delivery data packet has been provided to the user device 106, the process 440 proceeds to block 454, wherein the data packet and/or one or several components thereof is sent to and/or provided to the response processor 678. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 9:
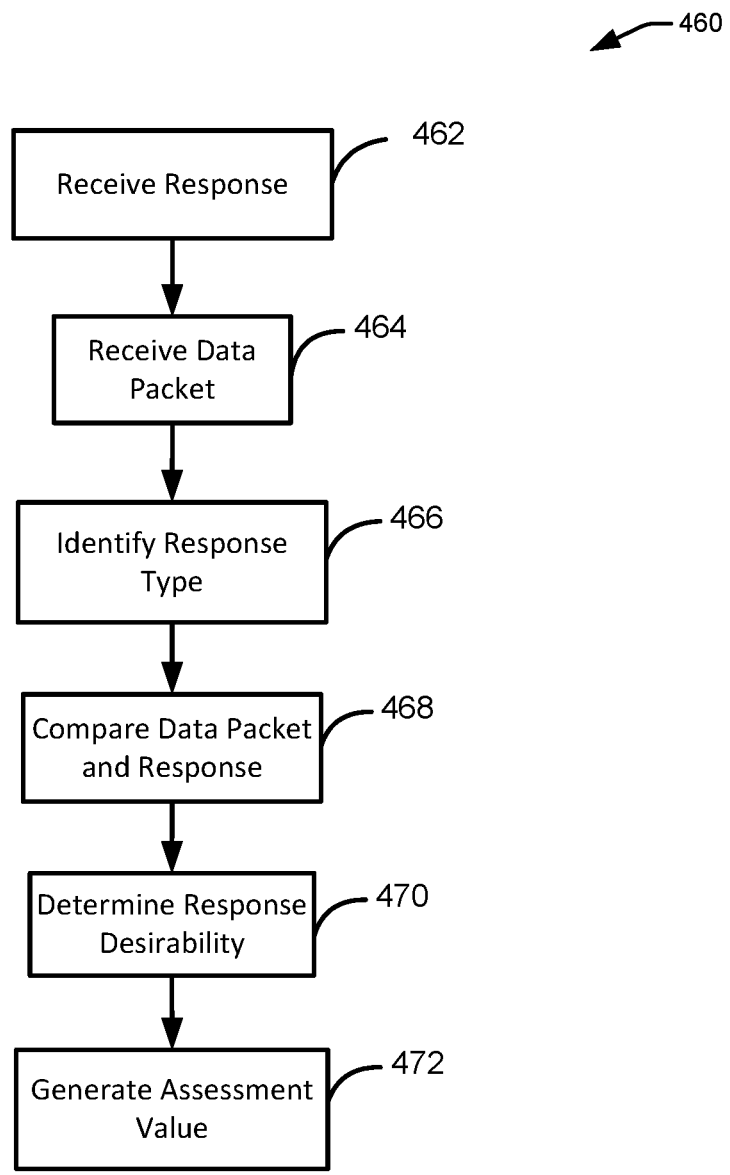
FIG. 9 is a flowchart illustrating one embodiment of a process for evaluating a response.

With reference now to FIG. 9, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response, either directly or indirectly, from the user device 106.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 10:
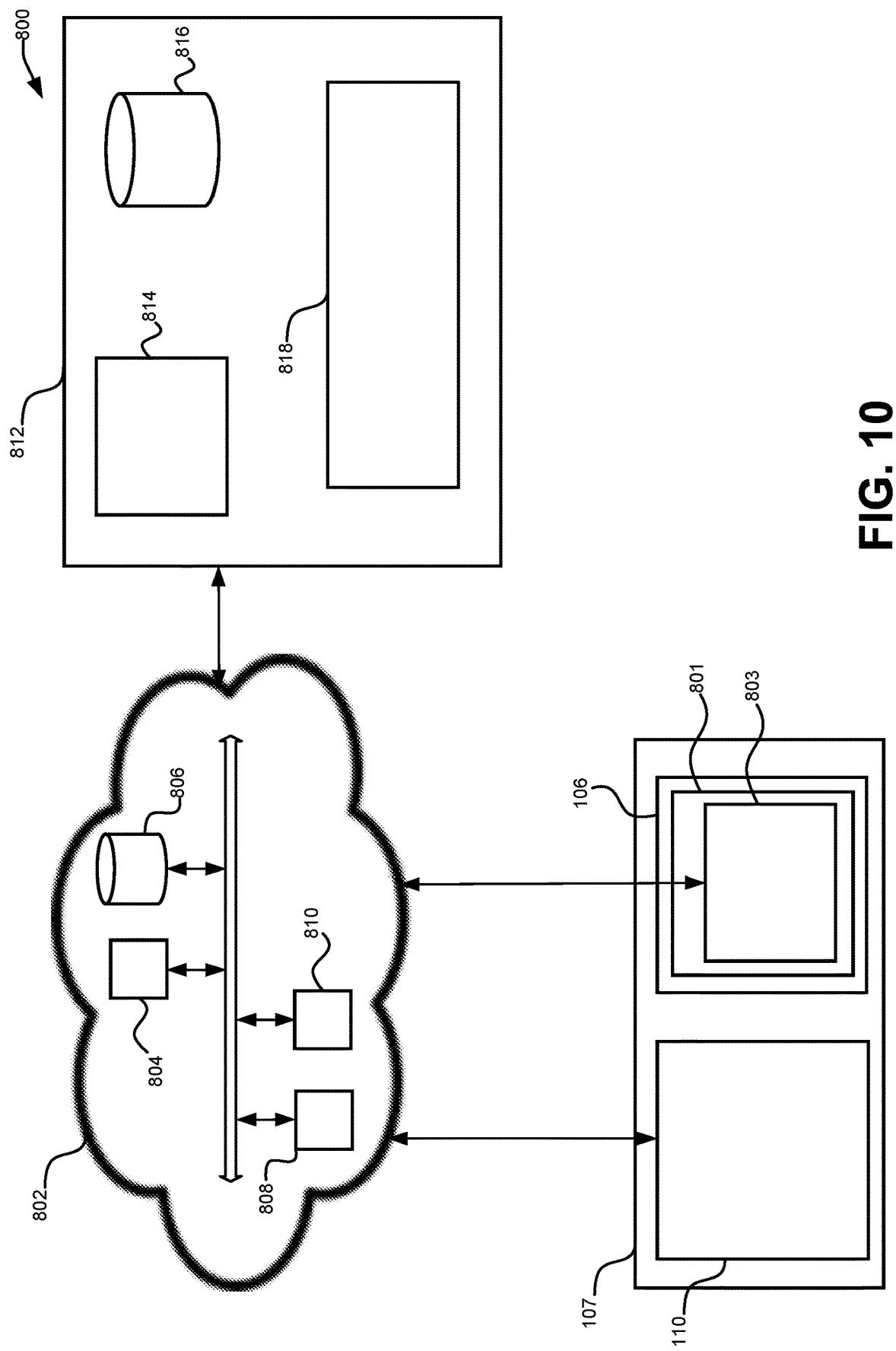
FIG. 10 a schematic illustration of one embodiment of a delivery network.

With reference now to FIG. 10, a schematic illustration of one embodiment of the content distribution network 100, and specifically of a delivery network 800 is shown. In some embodiments, the delivery network 800 can be configured to securely deliver content to a user device 106 and to securely receive inputs from the user device 106. In some embodiments, for example, this content can comprise one or several questions forming one or several tests. Delivery of the content and/or content authorship or maintenance according to the methods and systems disclosed herein can increase content security by preventing interception of meaningful test or question data transmitted to the user device, the interception of meaningful answer data transmitted from the user device, and/or the scraping of screens within the user device 106.

The delivery network includes the user device(s) 106 and the administrator device(s) 110 located in a testing center 107. The devices 106, 110 are each in communicating connection with the cloud 802 which can represent one or several cloud computing services and/or cloud computing. The delivery network 800 can comprise one or several servers 804 and one or several databases 806, which can be in communicating connection with the devices 106, 110 such as via, for example, the a communication network 120 via the internet. In some embodiments, the one or several servers 804 and/or one or several databases 806 can be located in the cloud 802.

As seen in FIG. 10, the user device 106 can comprise a first virtual machine 801 launched within the user device 106, and more specifically that can be launched and/or operating within an operating system of the user device 106. The user device 106 can further comprise a second virtual machine 803 launched and/or operating within the first virtual machine 801. As used herein, a virtual machine is an emulation of a computer system that can be, for example, based on a computer architecture and provide functionality of a physical computer. One or both of the virtual machines 801, 803 can be a system virtual machine (fully virtualization virtual machine), or a process virtual machine.

In some embodiments, one or both of the first and second virtual machines 801, 803 can include an ecosystem adapter that can be, for example, a non-persistent ecosystem adapter. The ecosystem adapter can be configured to establish and maintain an authorized client connection between the user device 106 and the content driver 808 and/or the cloud 802. In some embodiments, this connection can connect an unmanaged user device 106 and the managed cloud 802 host environments. In some embodiments, this adapter can include software and/or functionality configured to create and/or allow communication via a User Datagram Protocol (UDP) such as a remote display protocol including, for example, PCoIP®, redirection of signals to and from the I/O subsystem 526 to allow the content driver 808 and/or the cloud 802 to control all or portions of: the I/O subsystem 526, software containing the first and second virtual machines 801, 803, or the like.

The inclusion of the virtual machines 801, 803 can increase the security of the content delivered to the user device 106. Specifically, in some embodiments, each of the first and second virtual machines can include features, capabilities, and/or software capable of performing one or several desired content delivery functions, and neither the first nor second virtual machines 801, 803 include features, capabilities, and/or software capable of performing any function unrelated to one or several desired content delivery functions and/or capable of facilitating in accessing, stealing, and/or corrupting delivered content. By controlling the capabilities of the first and second virtual machines 801, 803, the ability of a user of the user device 106 to access, corrupt, and/or steal delivered content is minimized. Further, because the second virtual machine 803 operates within the first virtual machine 801, the second virtual machine 803 is insulated and/or protected from any software, feature, capability, function, or the like of the user device 106.

In some embodiments, for example, the operation of the second virtual machine 803 within the first virtual machine 801 can prevent data scraping including, for example, screen scraping and/or screen recording of the second virtual machine 803 from the user device 106. In the event that such an attempt was made, the data scraping attempt would only collect data delivered to the first virtual machine 801. More specifically, in the event of an attempt at screen scraping of delivered content launched from the user device 106, the result in the scraping of the display of the first virtual machine 801, which display would include no delivered content, but could, in some embodiments, provide only a black image. Thus, the use of the second virtual machine 803 within the first virtual machine 801 insulates the content delivered to and via the second virtual machine from functions, capabilities, operations, software, or the like of the user device 106. Further, as the functions, capabilities, operations, software, or the like of the first virtual machine 801 can be controlled, the ability to access delivered content via the first virtual machine 801 can be limited.

In some embodiments, the first and second virtual servers 801, 803 can be configured for remote update by, for example, the one or several servers 804. In some embodiments, the first and second virtual servers 801, 803 can be further configured to allow modification and/or operation of the user device 106 upon which the first and second virtual servers 801, 803 operate.

The one or several servers 804 can comprise any of the servers 102, 112, 114, 116 shown in FIG. 1, or the one or several servers 804 can be different than the servers 102, 112, 114, 116 shown in FIG. 1. In some embodiments, the one or several servers 804 can send and receive signals from other components of the delivery network 800 and perform one or several processing tasks according to computer code that can be, for example, stored in memory in communication with the one or several servers 804, or included in the one or several servers 804.

The one or several databases 806 can comprise the same or similar components as the database server 104. In some embodiments, the one or several databases 806 can be located in the cloud 802. The one or several databases can include content for presentation to a user via one or several user devices 106.

The delivery network 800 can include a content driver 808 that can be, for example, a launch test driver. In some embodiments, the content driver 808 can be a hardware or software module. In embodiments in which the content driver 808 is a software module, the content driver 808 can reside on and/or be implemented by the one or several servers 804. In some embodiments, the content driver 808 can be located in the cloud.

The content driver 808 can be configured to direct and/or control the delivery of content to the testing center 107. In some embodiments, the content driver directs and/or controls the delivery of content to the user device 106, and specifically to the second virtual machine 803 operating on the user device 106. Advantageously, delivery of content to the second virtual machine prevent the use of any software or functionality of the user device 106 being used to steal or access the delivered content. In some embodiments, the content driver 808 can be configured to receive a request for accessing of a test, control the user device 106 to launch one or several virtual machines, identify a test for delivery, select a question for delivery, generate an image based on the selected question, and transmit pixel data to the user device based on the generated image. The content driver 808 can further receive signals corresponding to one or several user inputs at the user device 106, and the content driver 808 can form one or several responses and/or answers from these received signals. In some embodiments, the content driver 808 can identify and/or retrieve one or several tests and/or one or several questions from the database 806.

The delivery network 800 can further include an evaluation module 810. In some embodiments, the evaluation module 810 can be a hardware or software module. In embodiments in which the evaluation module 810 is a software module, the evaluation module 810 can reside on and/or be implemented by the one or several servers 804. In some embodiments, the evaluation module 810 can be located in the cloud 802.

The evaluation module 810 can be receive response and/or answer information from the content driver 808 and can evaluate the received response and/or answer information. In some embodiments, this can include, for example, determining whether the received response and/or answer information corresponds to a correct and/or desired response and/or answer, or alternatively determining whether the received response and/or answer information corresponds to an incorrect response and/or answer. In some embodiments, this can include retrieving evaluation information associated with the question corresponding to the received answer and/or response from the database 806. In some embodiments, for example, the evaluation module 810 can receive data corresponding to a response and/or answer, and can compare the received data to evaluation information received and/or retrieved from the database 806. The evaluation module 810 can generate a score for the received response and/or answer based on the comparison of the received data and the evaluation information. This score can be associated with the user who provided the response and/or answer.

In some embodiments, one or both of the content driver 808 and the evaluation module 810 can reside within a pair of virtual machines comprising a first machine 801 and a second machine 803 operating inside of the first virtual machine 801. In some embodiments, when content is being delivered from the content driver 808 to the user device 106, the communication can be between the pair of virtual machines containing one or both of the content driver 808 and the evaluation module 810, and specifically, the second virtual machine 803 of the pair of virtual machines, and the second virtual machine 803 of the user device. In some embodiments, this communication can be via a layered protocol model such as OSI or TCP/IP, or via a User Datagram Protocol (UDP) such as a remote display protocol including, for example PCoIP®.

The delivery network 800 can further include a backend system 812. In some embodiments, content for delivery to the testing center 107, and specifically to the user device 106 in the testing center can be generated in the backend system 812 and can then be provided by the backend system 812 to the cloud 802 and/or the one or several servers 804 and the database 806. In some embodiments, the backend system 812 can include a backend server 814 that can be one or several of the servers 102, 112, 114, 116 shown in FIG. 1, and a backend database 816 that can be the database server 104 shown in FIG. 1, or the like. The backend database 816 can be in communicating connection with the cloud 802 such that content stored in the cloud 802, and specifically in the database 806 can be received from the backend system 812, and specifically from the backend database 816.

The backend system 812 can further include a creation network 818. In some embodiments, the creation network 818 can be a portion of the backend system 812 in which content is generated, created, and/or edited. In some embodiments, the creation network 818 can comprise one or several workstations, servers, databases, memory, or the like that can be used by one or several content authors to create, generate, edit, and/or store new content. The content generated by the creation network 818 can be stored in the database 816. In some embodiments, this creation network can communicate with the database 816 and/or components of the cloud 802 via a layered protocol model such as OSI or TCP/IP, or via a User Datagram Protocol (UDP) such as a remote display protocol including, for example PCoIP In such embodiments, this communication protocol can increase security of communications in the authoring of content.

Figure 11:
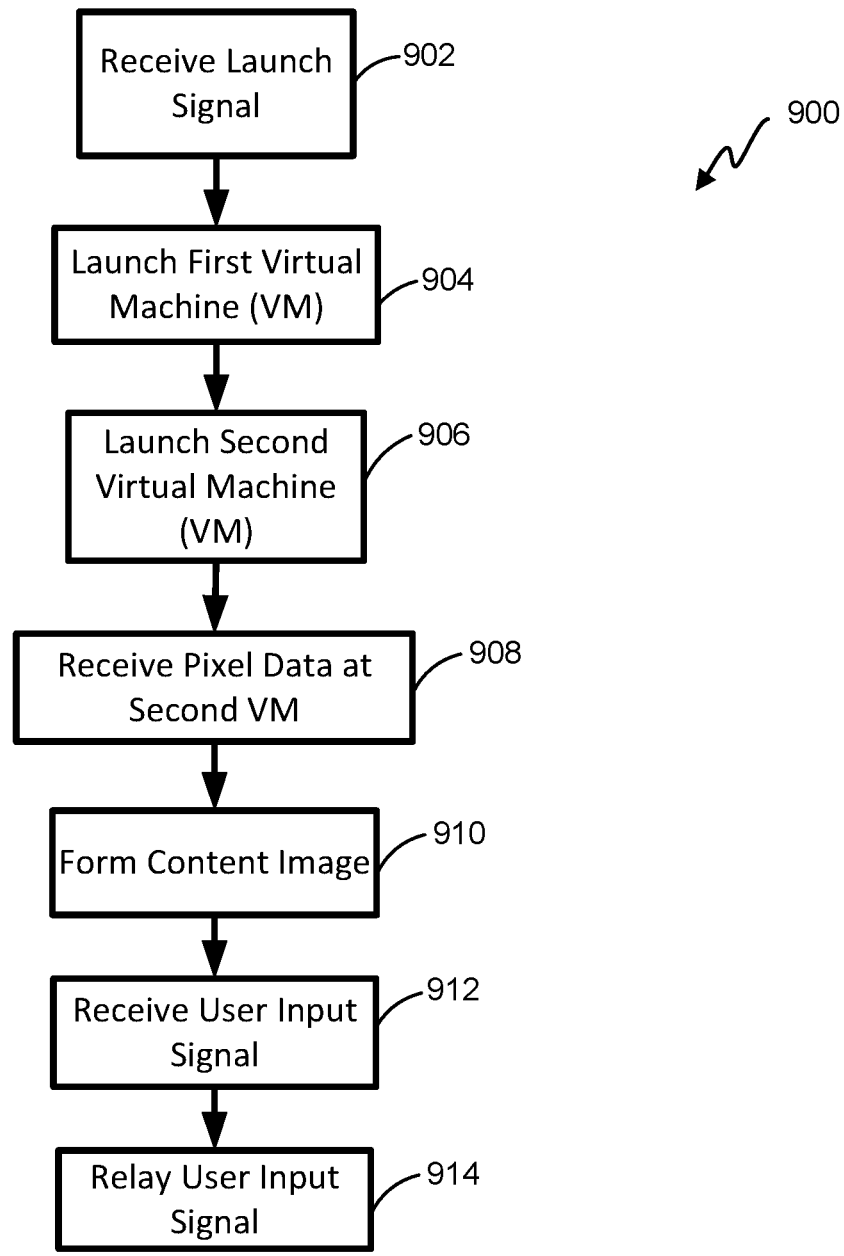
FIG. 11 is a flowchart illustrating one embodiment of a process for presenting content.

With reference now to FIG. 11, a flowchart illustrating one embodiment of a process 900 for presenting content is shown. In some embodiments, the process 900 can be performed by one or several components of the delivery network 800 including the user device 106.

The process 900 begins at block 902, wherein a launch signal is received. In some embodiments, the launch signal can be received by the user device 106 from the cloud 802 and/or from the content driver 808. After the launch signal has been received, the process 900 proceeds to block 904, wherein the first virtual machine 801 is launched. In some embodiments, the first virtual machine 801 can be launched in the user device 106, and specifically within the operating system of the user device 106.

After the first virtual machine 801 has been launched, the process 900 proceeds to block 906, wherein the second virtual machine 803 is launched. In some embodiments, the second virtual machine 803 can be launched in the first virtual machine 801 and/or from the operating system of the first virtual machine 801. As part of the launch of the second virtual machine 803, a communicating connection can be established between the user device 106 and the cloud 802, and/or between the user device 106 and the content driver 808. In some embodiments, this communication connection can be established between the content driver 808 and the second virtual machine 803. This connection can be a secure connection and/or a connection based on a layered protocol model such as those of the OSI or TCP/IP protocol suite, or via a User Datagram Protocol (UDP) such as a remote display protocol including, for example, PCoIP®.

After the second virtual machine 803 has been launched, the process 900 proceeds to block 908, wherein pixel data is received at the second virtual machine 803. In some embodiments, this pixel data can be received from the content driver 808 via the connection based on the layered protocol model or via a UDP. In some embodiments, this pixel data can include data identifying one or several pixels and data control the illumination of that pixel such as, for example, the color and/or brightness of that pixel. In some embodiments, the pixel data can comprise encoded pixel data.

After the pixel data has been received, the process 900 proceeds to block 910, wherein an image is formed and/or displayed based on the received pixel data. In some embodiments this can include, for example, the decoding of the received pixel data by the second virtual machine 803, the generation of one or several signals to control the display and/or screen associated with the second virtual machine 803 based on the pixel data, and the controlling of the display and/or screen with these one or several signals to display and/or form an image based on the pixel data.

After the image has been displayed and/or formed, the process 900 proceeds to block 912, wherein a user input signal is received. In some embodiments, this user input signal can be received via, for example, a keyboard, mouse, touchscreen, microphone, or the like associated with the user device 106 and/or via the I/O subsystem 526 of the user device. In some embodiments, this user input signal can be received in response to the formed and/or displayed image. In embodiments in which the content provided to the user device comprises a test, the received user input can correspond to an input to start, stop, or advance the test and/or to an answer to a question or prompt in the test.

After the user input signal has been received, the process 900 proceeds to block 914, wherein the user input signal is relayed to the content driver 808 and/or to the evaluation module 810. In some embodiments, the content driver 808 and/or the evaluation module 810 can generate a response based on one or several received user input signals and can then evaluate that response.

Figure 12:
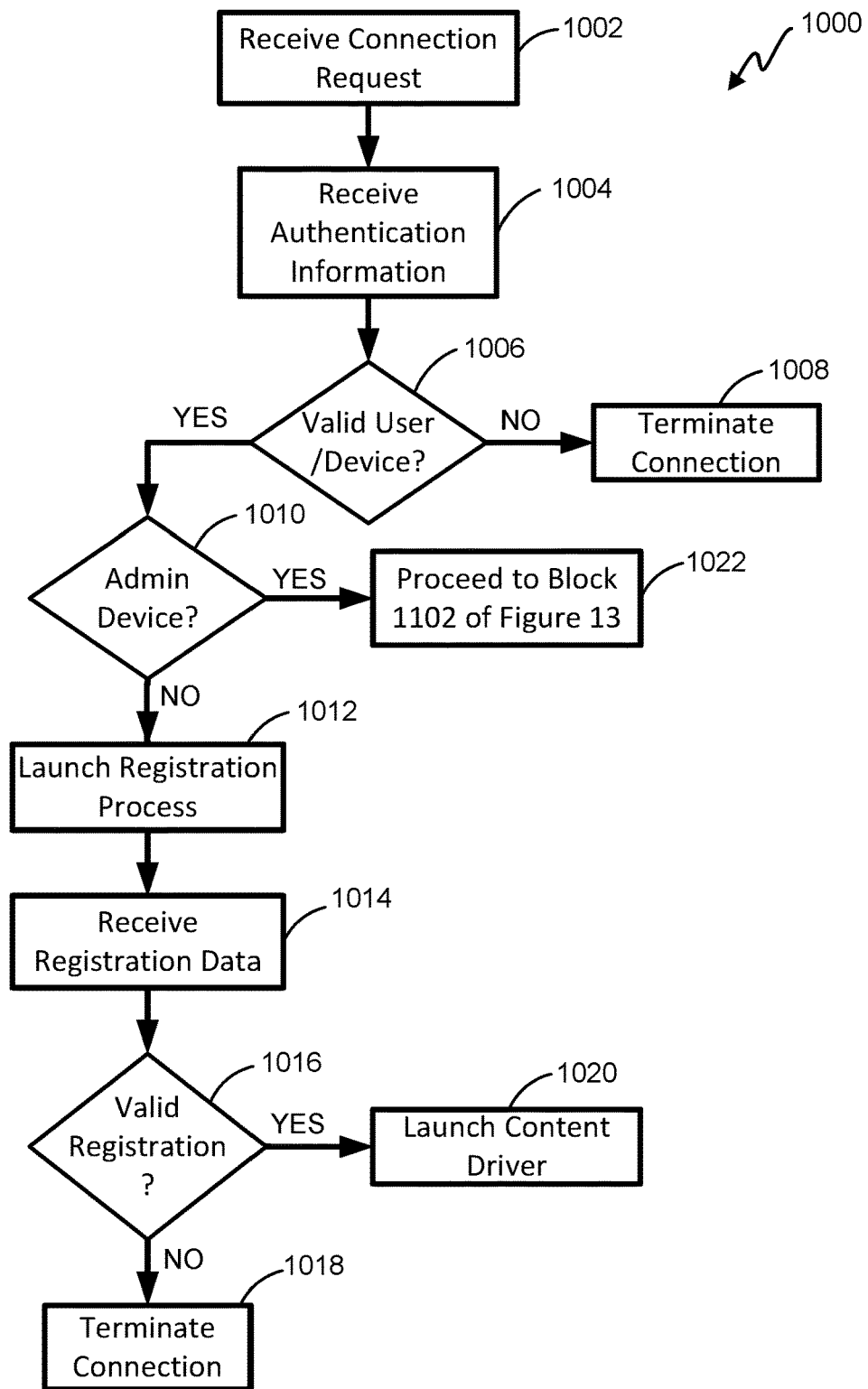
FIG. 12 is a flowchart illustrating one embodiment of a process for content delivery initiation.

With reference now to FIG. 12, a flowchart illustrating one embodiment of a process 1000 for content delivery initiation is shown. The process 1000 can be performed by all or portions of the delivery network 800 and specifically by all or portions of the cloud 802, the server 804, and/or the content driver 808. In some embodiments, the performing of process 1000 can result in the initiation of content delivery to a user device 106.

The process 1000 begins at block 1002 wherein a connection request is received. In some embodiments, the connection request can be received at the cloud 802 by, for example, the server 804 and/or the content driver 808. In some embodiments, the connection request can be received from the supervisor device 110. After the connection request has been received, the process 1000 proceeds to block 1004 wherein authentication information is received. In some embodiments, the authentication information can be received from the supervisor device 110 at the cloud 802 by, for example, the server 804 and/or the content driver 808. In some embodiments, the authentication information can include information whereby the user of the supervisor device 110 can be authenticated and/or whereby the supervisor device can be authenticated. In some embodiments this can include, for example, the providing of information identifying the user of the supervisor device such as, for example, a login, password, a username, a unique user identifier, or the like. In some embodiments, information whereby the supervisor device 110 can be authenticated can include, for example, a device identifier including, for example, an identifier based on one or several attributes of the supervisor device 100 such as, for example, a hash value. In some embodiments, communication between the test center 107 and the cloud 802 or components thereof can be performed via the communication network 120.

After the authentication information has been received, the process 1000 proceeds to decision state 1006 wherein it is determined if the authentication is successful. In some embodiments, this can include the determination by the server 800 for and/or the content driver 808 whether the received authentication information identifies a valid user and/or supervisor device 110. If it is determined that the authentication is unsuccessful, than the process 1000 proceeds to block 1008 and the communication between the cloud 802 and/or components of the cloud 802 and the testing center 107 including the supervisor device 110 is terminated.

Returning again to decision state 1006, if the authentication is successful, then the process 1000 proceeds to decision state 1010 wherein it is determined if the connection request is received from the supervisor device 110. In some embodiments, this can include determining whether the authentication information identifies a supervisor device 110 or the user device 106.

If it is determined that the connection request is received from the supervisor device 110, than the process 1000 proceeds to block 1012 wherein the check in process is launched. In some embodiments, the check in process can include a process whereby an intended recipient of content is identified and checked in so that content intended for that recipient can be provided. The check-in process can be launched by the cloud 802 or components thereof including the server 804 and/or the content driver 808.

In some embodiments, the launching of the check-in process can include requesting check-in data from the supervisor device 110, and more specifically sending a request for check-in data to the supervisor device 110. In some embodiments, this check-in data can include, for example, a photograph of the intended recipient, a signature of the intended recipient, the name of the intended recipient, biometric data associated with the intended recipient such as, for example, a palm vein template, or the like. As used herein, a palm vein template refers to one or several values or character strings, such as a hash, generated based on a pattern of veins or vessels in a portion of the intended recipient's body such as, for example, in the palm of the intended recipient's body. In some embodiments, the request for check-in data can be sent in the form of encoded pixel data that can be converted into an image on a display of supervisor device 106. Specifically, in some embodiments, a template, including a palm vein template can be sent from the supervisor device 110 to all or portions of the cloud 802 including the server 804 and/or the content driver 808. A template can be an encrypted binary file that can be, for example, transmitted via a communication such as via a tunneled communication.

After the check-in process has been launched, the process 1000 proceeds to block 1014 wherein the check-in data is received. In some embodiments, the check-in data can be received by the cloud 802 and/or the components thereof such as the server 804 and/or the content driver 808 from, for example, the supervisor device 110. In some embodiments, the check-in data is received as one or several electrical signals corresponding to user inputs to the supervisor device and/or two devices attached to the supervisor device. In some embodiments, the check-in data can comprise, data corresponding to a photograph of the intended recipient, data corresponding to a signature of the recipient, data corresponding to the name of the intended recipient, data corresponding to a biometric measure, such as, for example, a palm vein of the intended recipient, or the like. In embodiments in which the check-in data comprises a palm vein template, the palm vein template can be compared to a database of palm vein templates to determine and/or validate the identity of the intended recipient.

After the check-in data has been received, the process 1000 proceeds to decision state 1016 wherein it is determined if the check-in is valid. In some embodiments, this can include comparing the received check-in data to data previously received and identifying the intended user. In some embodiments, for example, content delivery, such as a test, is scheduled for a user, check-in data for that user can be gathered and stored in, for example, the database 806. After the check-in data has been received at block 1014, this newly received check-in data can be compared to the previously stored check-in data. If there is not a match between the newly received check-in data in the previously stored check-in data, then the check-in is invalid and the process 1000 proceeds to block 1018 wherein the connection is terminated and/or wherein a notification is provided to the content will not be delivered.

Returning again to decision state 1016, if it is determined that the check-in is valid, then the process 1000 proceeds to block 1020 wherein the content driver is launched. In some embodiments, the content driver can be launched in receipt to a launch signal by the content driver. In some embodiments, the launching of the content driver can include the identification of a user device for which the content driver is launched. In some embodiments, the launching of the content driver 808 can further include associating a value with one or several of the user and/or the user device 106 for which the content driver 808 is launched. In some embodiments, this value can be stored in the database 806. In some embodiments, the launching of the content driver can further include the generating of signals directing the launch of the first and second virtual machines by the user device 106.

Returning again to decision state 1010, if it is determined that the connection request is not received from the supervisor device 1010, then the process 1000 proceeds to block 1022 and continues to block 1102 of FIG. 11.

Figure 13:
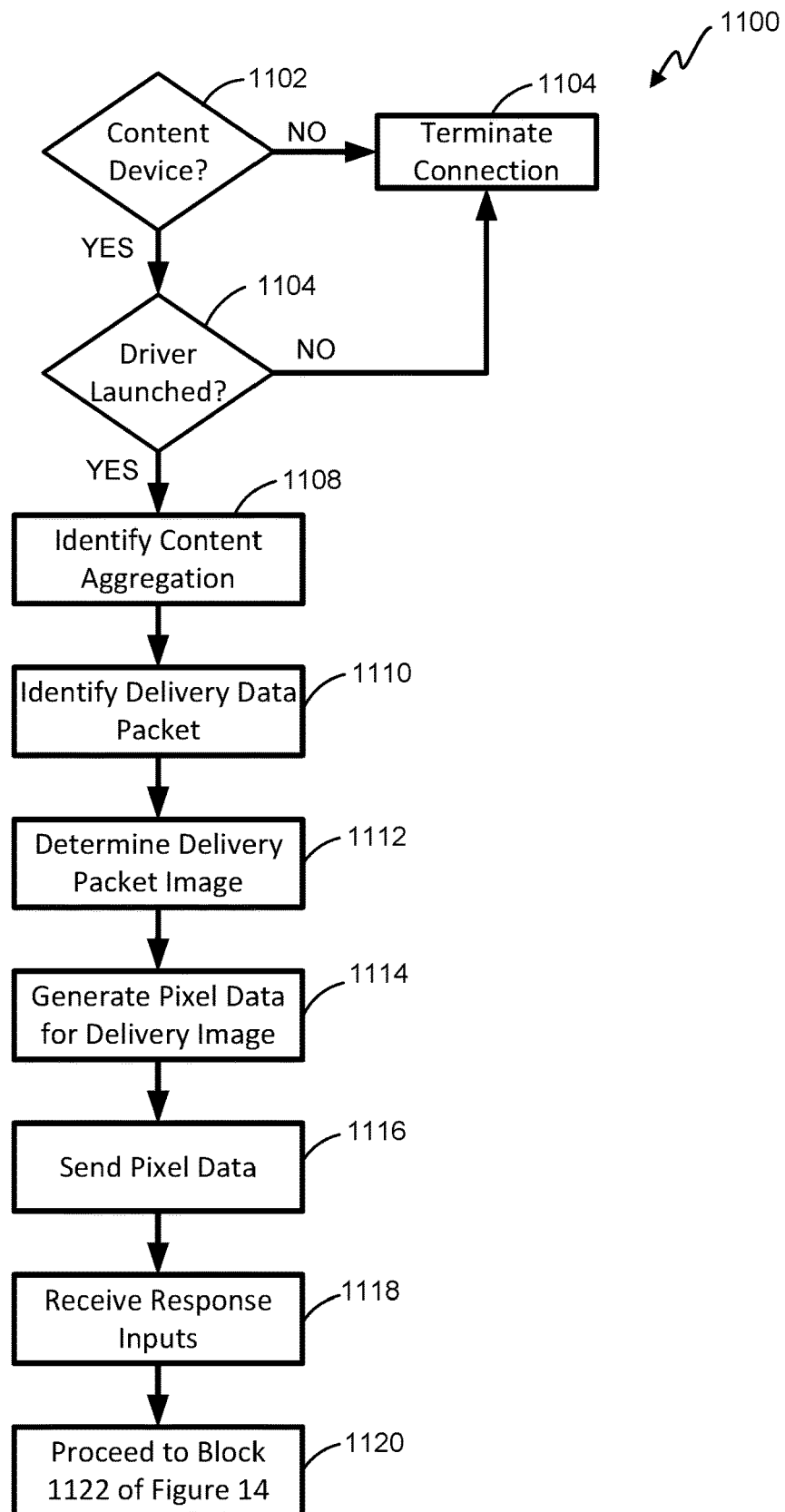
FIG. 13 is a flowchart illustrating a first part of one embodiment of a process for content delivery.
Figure 14:
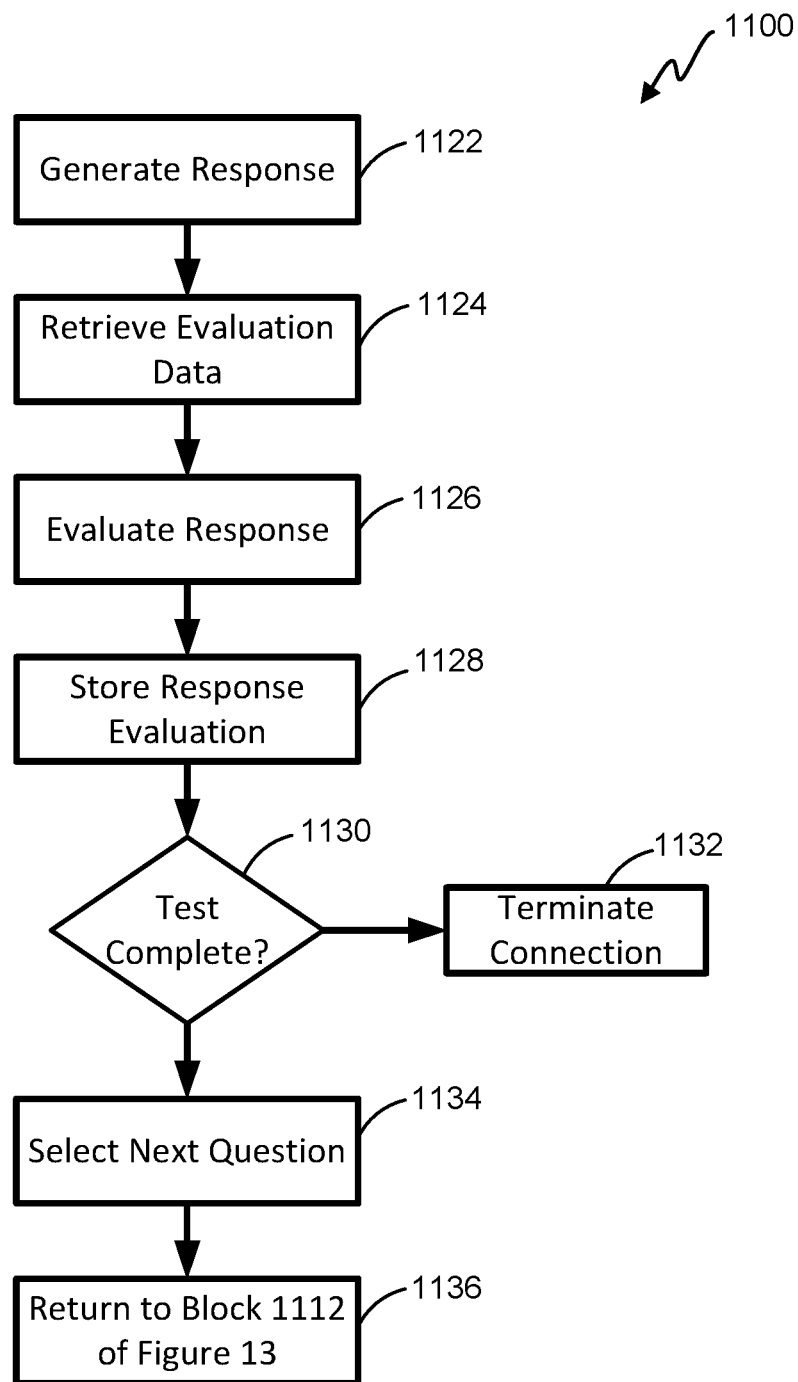
FIG. 14 is a flowchart illustrating a second part of one embodiment of a process for content delivery.

With reference now to FIGS. 13 and 14, a flowchart illustrating one embodiment of a process 1100 for content delivery is shown. The process 1100 can be performed by all or portions of the delivery network 800 and specifically by all or portions of the cloud 802, the server 804, and/or the content driver 808. In some embodiments, the performing of process 1100 can result in the secure delivery of content to the user of the user device 106 and the secure receipt of user input from the user of the user device 106.

The process 1100 begins a block 1102 wherein it is determined if the connection request received in block 1002 was received from the user device 106, also referred to herein as the content device. In some embodiments, this determination can be made based on the authentication information received in block 1004. If it is determined that the connection request is not received from the user device 106, then the process 1100 proceeds to block 1104, wherein the connection is terminated.

Returning again to decision state 1102, if it is determined that the connection request is received from the user device 106, than the process 1100 proceeds to decision state 1106 wherein it is determined if the content driver 808 has been launched. In some embodiments, this can include determining whether the content driver 808 has been launched according to the step of block 1020. In some embodiments the determination of whether the content driver 808 has been launched can include determining whether a value indicative of the launch of the content driver 808 for the user and/or user device 106 is stored in the database 806. If it is determined that the content driver has not been launched, than the process 1100 proceeds to block 1104 wherein the connection with the user device 106 is terminated.

Returning again to decision state 1106, if it is determined that the content driver has been launched, than the process 1100 proceeds to block 1108 wherein content for delivery to the user of the user device 106 is selected. In some embodiments, this can include retrieving information from the database 806 identifying content for delivery to the user of the user device 106 and/or retrieving the content for delivery to the user of the user device 106 from the database. In some embodiments, this content can comprise a test, a quiz, or the like.

After the content for delivery to the user of the user device has been selected, the process 1100 proceeds to block 1110 wherein a subset of that content is identified and/or selected. In embodiments in which the content comprises a test, the subset of content can comprise one or several questions in that test. In some embodiments, these one or several questions can be selected from a plurality of questions associated with the test based on, for example, the skill level or expected skill level of the user, a predetermined sequence or ordering, or these one or several questions can be randomly selected from a plurality of questions associated with the test.

After the subset of content has been selected, the process 1100 proceeds to block 1112 wherein an image for the subset of content is determined and/or generated. In some embodiments, this can include generating the image for display to the user by the user device 106. In some embodiments, this generated image can be based on information received from the user device 106 such as, for example, the size and/or aspect ratio of the display, screen, or monitor of the user device 106, the color settings, color capabilities and/or resolution of the user device 106, or the like. In some embodiments, the image can be generated so as to properly display by the user device 106 based on this information received from the user device 106.

After the image has been generated, the process 1100 proceeds to block 1114 wherein pixel data is generated. In some embodiments, this pixel data can be generated for some or all of the pixels in the image generated in block 1112. In some embodiments, the pixel data can comprise data indicating one or several desired illumination aspects for the associated pixel including, for example, color, brightness, or the like. In some embodiments, the pixel data can be encoded and/or encrypted, which encoding and/or encryption can be performed according to one or several known pixel encoding schemes. In some embodiments, the pixel data can be encoded and/or encrypted with a codec located at the content driver 808, and can be subsequently decoded, upon receipt by the user device 106 by a codec on the user device 106, and specifically by a codec located in the second virtual machine 803 on the user device 106.

After the pixel data has been generated the process 1100 proceeds to block 1116 wherein the pixel data is sent by the content driver 808 to the user device 106. In some embodiments, this pixel data can be specifically sent from the content driver 808 to the second virtual machine 803 of the user device 106. In some embodiments, the pixel data can be sent by the content driver 808 via a layered protocol model or via a UDP. In some embodiments, the second virtual machine 803 can receive the pixel data and can generate an image based on the pixel data and display the image to the user of the user device 106 via the I/O subsystem 526.

After the pixel data has been sent, the process 1100 proceeds to block 1118 wherein one or several response inputs and/or response signals are received from the user device 106 and specifically from the second virtual machine 803. In some embodiments, these response inputs and/or response signals correspond to user inputs received by the I/O subsystem 526 of the user device 106. These response signals and/or response inputs can be received by the content driver 808 via a layered protocol model or via a UDP. In some embodiments, these response signals can be communicated via re-direct software of the user device, which redirect software can allow the remote control of components of the I/O subsystem 526 of the user device. After the response inputs have been received, the process 1100 proceeds to block 1120 and continues to block 1122 of FIG. 14.

At block 1122, one or several responses are generated from the response inputs and/or response signals received in block 1118. In some embodiments, this can be performed by the content driver 808. In some embodiments, the generated response can be provided to the evaluation module 810. In some embodiments, the generation of the response can include the aggregation of one or several response inputs and the storage of those one or several response inputs. In some embodiments, the generation of the response can include the determining of an effect of those one or several response inputs on one or several fields, icons, buttons, or the like in a user interface. In some embodiments, for example, the response input can comprise an input with a mouse or track pad and the click of a mouse or trackpad button. These inputs can be overlaid on one or several icons, fields, buttons, or the like displayed to the user at the time of the generation of the response inputs. This overlaying can be used to determine the response by the user, which response can be, for example, the selecting and/or clicking of a button, the selecting of a field and the entry of text in that selected field, selection of one or several words, images, text or text strings, or the like.

After one or several responses have been generated, the process 1100 proceeds block 1124 wherein evaluation data is retrieved. In some embodiments, for example, the content and/or test stored in the database 806 can be associated with evaluation data that can, in some embodiments be likewise stored in the database. This evaluation data can be received and/or retrieved from the database by, for example, the content driver 808 and/or the evaluation module 810.

After the evaluation data has been received and/or retrieved, the process 1100 proceeds to block 1126 wherein the response generated in block 1102 is evaluated. In some embodiments, this can include the comparison of the generated response to the retrieved evaluation data to determine whether the response is a correct response and/or desired response and/or the degree to which the response is a correct response and/or desired response. This evaluation can be performed by the evaluation module 810.

After the responses been evaluated, the process 1100 proceeds block 1128 wherein the response evaluation is stored. In some embodiments, this can include storing one or several values indicating whether the response was a correct answer/or desired response and/or the degree to which the response was a correct and/or desired response. The response evaluation can, in some embodiments, be stored in the database 806.

After the response evaluation has been stored the process 1100 proceeds to decision state 1130 wherein it is determined if all of the content has been delivered, and in some embodiments, whether the test is complete. This determination can be made by the content driver 808. If it is determined that the test is complete and/or that all the content has been delivered, the process 1100 can proceed to block 1132 wherein the connection with the user device 106 and specifically with the second virtual machine 803 is terminated. In some embodiments, this can include providing the user with an indication of the completeness of the content delivery and/or the test.

Returning again to decision state 1130, if it is determined the content delivery is not complete and/or that the test is not complete, the process 1100 proceeds block 1134 wherein a next subset of content and/or next question is selected. In some embodiments, this can be performed similar to the step of block 1110 based on content and/or questions that have already been provided to the user and/or content and/or questions that have not yet been provided to the user. After the next question has been selected, the process 1100 proceeds to block 1136 and returns to block 1112 of FIG. 13.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for securely providing content, the system comprising:
    a database, comprising hardware components;
    a server in communication with the database, the server comprising:
        a motherboard, a processing unit, a memory system, a hard drive, a network interface and a power supply;
        an evaluation module configured to receive response information and evaluate the received response information; and
        a content driver, comprising a software module, in communication with the evaluation module and the database, wherein the content driver is configured to:
        launch in response to receipt of a launch signal;
        generate and send a signal, from the content driver of the server to a user device, directing a launch of a first virtual machine on the user device;
        generate and send a signal, from the content driver of the server to the user device, directing a launch of a second virtual machine within the first virtual machine on the user device, wherein:
            i) the first and the second virtual machines include features and capabilities for performing one or more desired content delivery functions,
            ii) neither the first nor the second virtual machine includes features or capabilities capable of accessing, stealing, and/or corrupting delivered content comprising pixel data, and
            iii) operation of the second virtual machine in the first virtual machine prevents data scraping of data delivered to the second virtual machine;
        identify content for delivery to the second virtual machine;
        generate pixel data for the content for delivery to the second virtual machine;
        send the pixel data to the second virtual machine, wherein the server is configured to communicate with the user device via a User Datagram Protocol;
        receive a plurality of response inputs from the second virtual machine;
        generate a response based on the received response inputs; and
        provide the generated response to the evaluation module.

2. The system of claim 1, wherein the database comprises content for delivery to a user device and evaluation content associated with the content for delivery to the user device.

3. The system of claim 2, wherein the generated pixel data is encrypted.

4. The system of claim 3, wherein the content driver further comprises a codec configured to encrypt the pixel data.

5. The system of claim 1, wherein the User Datagram Protocol comprises a remote display protocol.

6. The system of claim 5 wherein generating a response comprises aggregating at least one response input.

7. The system of claim 6, wherein the evaluation module is configured to retrieve evaluation data from the database and evaluate the generated response according to the retrieved evaluation data.

8. The system of claim 7, wherein the content driver is configured to generate a communicating connection to the user device.

9. The system of claim 8, wherein the content driver is configured to: determine completion of content delivery to the user device; and terminate the communicating connection with the user device.

10. The system of claim 9, wherein the server and the database can be in communication with a backend server and a backend database via a communication network.

11. A method of securely providing content, the method comprising:
    launching a content driver, comprising a software module, in response to receipt of a launch signal;
    generating and sending a signal, from the content driver to a user device, directing a launch of a first virtual machine on the user device;
    generating and sending a signal, from the content driver to the user device, directing a launch of a second virtual machine within the first virtual machine on the user device, wherein:
        i) the first and the second virtual machines include features and capabilities for performing one or more desired content delivery functions,
        ii) neither the first nor the second virtual machine includes features or capabilities capable of accessing, stealing, and/or corrupting delivered content comprising pixel data, and
        iii) operation of the second virtual machine in the first virtual machine prevents data scraping of data delivered to the second virtual machine;
    identifying with the content driver content for delivery to the second virtual machine;
    generating pixel data with the content driver for the content for delivery to the second virtual machine;
    sending the pixel data from the content driver to the second virtual machine, wherein the pixel data is sent to the second virtual machine via a User Datagram Protocol;

receiving a plurality of response inputs at the content driver from the second virtual machine;

generating with the content driver a response based on the received response inputs; and evaluating the response.

12. The method of claim 11, wherein the generated pixel data is encrypted.

13. The method of claim 12, wherein the generated pixel data is encrypted.

14. The method of claim 11, wherein the User Datagram Protocol comprises a remote display protocol.

15. The method of claim 14, wherein generating a response comprises aggregating at least one response input.

16. The method of claim 15, further comprising retrieving evaluation data and evaluating the generated response according to the retrieved evaluation data.

17. The method of claim 16, further comprising generating a communicating connection to the user device.

18. The method of claim 17, further comprising: determining completion of content delivery to the user device; and terminating the communicating connection with the user device.

* * * * *